(12) United States Patent
Meissner

(10) Patent No.: US 11,260,885 B2
(45) Date of Patent: *Mar. 1, 2022

(54) OVERHEAD TRANSPORT AND ROUTE MANAGEMENT SYSTEM

(71) Applicant: EAGLERAIL CONTAINER LOGISTICS, LLC, Chicago, IL (US)

(72) Inventor: J. Michael Meissner, Hinsdale, IL (US)

(73) Assignee: EagleRail Container Logistics, LLC, Chicago, IL (US)

( * ) Notice: Subject to any disclaimer, the term of this patent is extended or adjusted under 35 U.S.C. 154(b) by 274 days.

This patent is subject to a terminal disclaimer.

(21) Appl. No.: 16/502,867

(22) Filed: Jul. 3, 2019

(65) Prior Publication Data

US 2020/0001896 A1 Jan. 2, 2020

Related U.S. Application Data

(63) Continuation of application No. 15/335,422, filed on Oct. 26, 2016, now Pat. No. 10,507,846.

(60) Provisional application No. 62/337,272, filed on May 16, 2016, provisional application No. 62/337,276, filed on May 16, 2016, provisional application No.
(Continued)

(51) Int. Cl.
*B61B 3/02* (2006.01)
*B61B 3/00* (2006.01)
*B60L 13/00* (2006.01)
*B65G 63/00* (2006.01)

(52) U.S. Cl.
CPC .............. *B61B 3/00* (2013.01); *B60L 13/006* (2013.01); *B61B 3/02* (2013.01); *B65G 63/004* (2013.01); *Y02T 30/00* (2013.01)

(58) Field of Classification Search
CPC .. B61B 3/00; B61B 3/02; B61B 10/00; B61B 10/02; B61B 13/00; B61B 13/04; B61B 15/00
See application file for complete search history.

(56) References Cited

U.S. PATENT DOCUMENTS

| 3,091,188 A | 5/1963 | Graham |
| 3,606,053 A | 9/1971 | Whiteman |
| 3,812,987 A | 5/1974 | Watatani |

(Continued)

FOREIGN PATENT DOCUMENTS

| CN | 2871475 Y | 2/2007 |
| CN | 201037104 Y | 3/2008 |

(Continued)

OTHER PUBLICATIONS

CN App. No. 201680076475.6 Third Chinese Office Action dated Sep. 11, 2020 "COA0911".

(Continued)

*Primary Examiner* — Robert J McCarry, Jr.
(74) *Attorney, Agent, or Firm* — Cook Alex Ltd.

(57) ABSTRACT

An overhead transport system includes a suspended railway and a motorized carrier configured to travel along the suspended railway. The motorized carrier includes a motorized trolley configured to move the motorized carrier along the suspended railway, chassis/beam configured to carry an object below the motorized trolley, and a bumper and deflection system configured to prevent the object from contacting another object.

12 Claims, 14 Drawing Sheets

Related U.S. Application Data

62/249,086, filed on Oct. 30, 2015, provisional application No. 62/246,535, filed on Oct. 26, 2015.

(56) References Cited

U.S. PATENT DOCUMENTS

| | | | |
|---|---|---|---|
| 3,861,315 A * | 1/1975 | Rypinski | B61D 3/20 104/18 |
| 4,059,194 A | 11/1977 | Barry | |
| 4,106,639 A | 8/1978 | Montgomery et al. | |
| 4,220,096 A | 9/1980 | Horowitz | |
| 4,318,346 A | 3/1982 | Sessum | |
| 4,791,871 A | 12/1988 | Mowll | |
| 4,841,871 A | 6/1989 | Leibowitz | |
| 4,872,798 A | 10/1989 | Ide | |
| 4,973,219 A | 11/1990 | Brickner et al. | |
| 5,016,542 A | 5/1991 | Mitchell | |
| 5,074,220 A | 12/1991 | Petersen | |
| 5,203,135 A | 4/1993 | Bastian | |
| 5,733,092 A | 3/1998 | Barry | |
| 5,775,866 A | 7/1998 | Tax et al. | |
| 6,089,164 A | 7/2000 | Ostick | |
| 6,269,904 B1 | 8/2001 | Morhaus | |
| 6,324,989 B1 | 12/2001 | Taylor et al. | |
| 6,685,418 B2 | 2/2004 | Takehara et al. | |
| 6,810,817 B1 | 11/2004 | James | |
| 7,028,618 B2 | 4/2006 | Wallner | |
| 7,246,559 B2 | 7/2007 | Stromberg | |
| 7,603,952 B2 | 10/2009 | Vetesnik | |
| 7,686,558 B2 | 3/2010 | Tian et al. | |
| 8,146,507 B2 | 4/2012 | Hess | |
| 8,292,032 B2 | 10/2012 | Knaak | |
| 8,375,865 B2 | 2/2013 | Zayas | |
| 8,439,180 B2 | 5/2013 | Zhang et al. | |
| 10,155,633 B2 | 12/2018 | Heide et al. | |
| 10,507,846 B2 * | 12/2019 | Meissner | B61B 3/02 |
| 2008/0213073 A1 | 9/2008 | Benedict et al. | |
| 2009/0078535 A1 | 3/2009 | Tabler | |
| 2009/0090267 A1 | 4/2009 | Bruns | |
| 2010/0219018 A1 | 9/2010 | Knaak | |
| 2013/0125778 A1 | 5/2013 | LaCabe | |

FOREIGN PATENT DOCUMENTS

| | | |
|---|---|---|
| CN | 101723244 A | 6/2010 |
| CN | 102229398 A | 11/2011 |
| CN | 102862906 A | 1/2013 |
| CN | 203006179 U | 6/2013 |
| CN | 103803409 A | 5/2014 |
| CN | 204038863 U | 12/2014 |
| CN | 204098952 U | 1/2015 |
| CN | 204098952 U | 1/2015 |
| CN | 104640793 B | 5/2015 |
| CN | 204701607 U | 10/2015 |
| CN | 101559824 A | 10/2019 |
| DE | 3621648 A1 | 1/1988 |
| DE | 19638578 A1 | 3/1998 |
| DE | 19812993 A1 | 10/1998 |
| JP | S61200829 U | 9/1986 |
| JP | S61200829 U | 12/1986 |
| JP | H0597251 A | 4/1993 |
| JP | H143329844 B2 | 9/2002 |
| JP | 2005257400 A | 9/2005 |
| JP | H172005257400 A | 9/2005 |
| JP | H252013256235 A | 12/2013 |
| WO | 2003104132 A1 | 12/2003 |
| WO | WO 2003104132 A1 | 12/2003 |
| WO | 2006083230 A1 | 8/2006 |
| WO | WO 2006083230 A1 | 8/2006 |
| WO | 2008046728 A1 | 4/2008 |
| WO | WO 2008046728 A1 | 4/2008 |
| WO | 2011137402 A | 11/2011 |
| WO | WO-2011137402 A | 11/2011 |
| WO | WO 2011137402 A | 11/2011 |

OTHER PUBLICATIONS

IN App. No. 201847001370 Indian Examination Report dated Aug. 26, 2020 "INER0826".

Guozhang, "Container Gantry Cranes", China Railway Publisher, 1983, pp. 102-107.

Chunsheng, "Configures and Maintenance of Electric Handling Machineries", 2003, pp. 346-350.

Examination Report issued in connection with Indian Application No. 201847001370 dated Aug. 26, 2020.

First Office Action dated Sep. 11, 2020 in connection with Chinese Patent Application No. 201680076475.6.

First Office Action dated Nov. 4, 2019 in connection with Chinese Patent Application No. 2017800297024.

Modero: "Suspended Railways Mining Transport", TurboSquid 3D Models, Product ID 938317, Published Jun. 24, 2015, retrieved Sep. 1, 2015. <URL:http://www.turbosquid.com/3d-models/3d-model-of-suspended-railway-cargo-transport/938317>.

Naess, Olav: "The Beamway" Beamway Introduction, published 2006, retrieved Sep. 1, 2015. <URL: http://on-nor.net/beamwayintro.html>.

International Search and Written Opinion dated Feb. 23, 2017 in connection with PCT/US2016/058962.

International Search and Written Opinion dated Apr. 21, 2017 in connection with PCT/US2016/058963.

International Search and Written Opinion dated Aug. 28, 2017 in connection with PCT/US2017/032770.

International Search and Written Opinion dated Sep. 17, 2017 in connection with PCT/US2017/032769.

EPO Communication dated Jun. 8, 2018 in connection with European application No. 16801329.0.

EPO Communication dated Jun. 8, 2018 in connection with European application No. 16801894.3.

EPO Communication dated Jan. 3, 2019 in connection with European application No. 17731331.9.

First Office Action dated May 24, 2019 in connection with Chinese application No. 2016800764756.

International Search and Written Opinion dated Sep. 18, 2017 in connection with PCT/US2017/032769.

Second Office Action dated Feb. 18, 2020 in connection with Chinese Patent Application No. 2016800764756.

First Office Action dated Jun. 1, 2020 in connection with Chinese Patent Application No. 2016800764864.

EP App. No. 16801329.0 European Search Report dated Mar. 1, 2021 "EPOA0301".

EP App. No. 16801894.3 European Search Report dated Dec. 17, 2020 "EPOA1217".

BR App. No. 11 2017 016737-9 Office Action dated Jun. 8, 2021 "BROA0608a".

BR App. No. 11 2017 016740-9 Office Action dated Jun. 8, 2021 "BROA0608b".

CN App. No. 201680076486.4 Second Office Action dated Apr. 19, 2021 "COA0419".

U.S. Appl. No. 16/502,858 Office Action dated Jun. 18, 2021 "USOA0618a".

Zhang, "2013 Crane Design Manual (Second Edition) Chinese Edition)", 2013.

EPO Communication dated Dec. 17, 2020 in connection with European application No. 16801894.3.

Examination Report issued in connection with Indian Application No. 201847001449 dated Feb. 17, 2021.

EPO Communication dated Mar. 1, 2021 in connection with European application No. 16801329.0.

Second Office Action dated Apr. 19, 2021 in connection with Chinese Patent Application No. 201680076486.4.

Office Action dated Jun. 8, 2021 in connection with Brazilian Patent Application No. BR 11 2017 016737-9.

Office Action dated Jun. 8, 2021 in connection with Brazilian Patent Application No. BR 11 2017 016740-9.

Port Machinery Design Manuals, China Communications Press, Jan. 2001, pp. 1445-1450.

"Highspeed Train Generals and Trollies", China Railway Publishing House, Aug. 2015, pp. 119-122.

(56) References Cited

OTHER PUBLICATIONS

EPO Communication dated Oct. 20, 2021, issued in connection with European application No. 16801894.3.
Third Office Action dated Nov. 10, 2021 issued in connection with Chinese Patent Application No. 201680076486.4.

* cited by examiner

OVERHEAD TRANSPORT AND ROUTE MANAGEMENT SYSTEM

CROSS-REFERENCE TO RELATED APPLICATION(S)

This application is a continuation of U.S. patent application Ser. No. 15/335,422 filed on Oct. 26, 2016 entitled "Overhead Transport and Route Management System". This application is also related to and claims priority benefits from U.S. provisional patent application Ser. No. 62/246,535 filed on Oct. 26, 2015, entitled "Overhead Transportation and Route Management System". This application is also related to and claims priority benefits from U.S. provisional patent application Ser. No. 62/337,272 filed on May 16, 2016, entitled "Carrier Configured to Transport Various Sized Objects". This application is also related to and claims priority benefits from U.S. provisional patent application Ser. No. 62/337,276 filed on May 16, 2016, entitled "Sliding Track Switch for Monorail Based Container Carrier". This application is also related to and claims priority benefits from U.S. provisional patent application Ser. No. 62/249,086 filed on Oct. 30, 2015, entitled "Adjustable Container Carrier". The '422, '272, '276, '535, and '086 applications are each hereby incorporated by reference in their entireties.

FIELD OF THE INVENTION

The present disclosure relates to the transfer and movement of international shipping containers in port and transfer terminal facilities. In particular, the present disclosure relates to an overhead transport system and route management system for transporting shipping containers from one location in a port, terminal or warehouse facility to other location(s).

Containers, including intermodal containers are used for the transport of freight. Intermodal containers are manufactured according to specifications from the International Organization for Standardization (ISO), and are suitable for multiple transportation methods such as truck, rail, or ship.

Approximately 90% of non-bulk cargo worldwide is transported via intermodal shipping containers arranged on ships. When these containers arrive at ports (either by land or by sea) they must be moved onto or from the ships, trains, and trucks.

Transferring containers from one mode of transportation to another is time and energy intensive. Loading/unloading ships is often conducted at the ground level with various mechanical machines such as cranes, trucks, forklifts, and straddle carriers. Many of these machines burn fossil fuels and are inefficiently applied.

Intermodal containers can be up to 53 feet (16.15 meters) long, and can weigh in the range of 35-40 tons (31.8-36.3 metric tons) when fully loaded. One particular problem with current methods for transferring intermodal shipping containers is that they require a large amount of ground space for maneuvering the containers into place, and ground space is a premium at and around busy ports. Another problem with current methods for transferring ISO containers is that the large amount of time taken to unload ships often leads to port congestion and container backlog.

To alleviate some of these problems, the use of overhead rail transport systems has been suggested. An overhead monorail solution provides advantages that significantly improves container port operations, however it is not without its challenges. One challenge, in particular, involves quickly loading/unloading intermodal containers of various sizes onto the overhead rail transportation system.

What is needed is a carrier system for efficient material handling transferring containers from one form of transportation to another, and transporting containers from one area to another (e.g. port area to inland terminals). In some embodiments, the carrier works via an overhead rail transportation system to help eliminate, or at least reduce, backlogs at ports and clear up port congestion.

Moreover, today's container handling equipment is generally not suited for close-tolerance positioning and alignment of containers, such as to an overhead transport system carrier, as these overhead carriers are necessary elements in the efficient transport of shipping containers from one location to another

SUMMARY OF THE INVENTION

The foregoing and other shortcomings of conventional transport systems are overcome by an overhead transport system that can comprise:
 (a) a suspended railway;
 (b) at least one motorized carrier configured to travel along the suspended railway, the at least one motorized carrier comprising:
  (i) at least one motorized trolley configured to move the at least one motorized carrier along the suspended railway;
  (ii) a chassis/beam configured to carry an object below the motorized trolley; and
  (iii) a bumper and deflection system configured to prevent the object from adversely contacting another object.

In the system, the suspended railway can comprise at least one elevated rail/track, made of steel, concrete or combination of like materials. The suspended railway can also comprise an elevated rail/track and at least one single structure (for example, a truss) supporting the elevated rail/track.

The suspended railway can also comprise an elevated rail/track and at least one structural system supporting the elevated rail. In some embodiments, this can be a single or double steel truss support system.

In the system, the suspended railway can comprise at least one elevated switch configured to selectively direct the at least one motorized carrier to different portions of the suspended railway.

In the system, the at least one motorized trolley can comprise at least one motor, a plurality of wheels configured to ride along the suspended railway, and a connection-flange point for each of the plurality of wheels that connects the wheel to the at least one motor through at least one gear box.

In the system, the at least one motorized trolley can comprise at least one electric motor. The at least one electric motor can comprise a regenerative power system. The suspended railway can comprise at least one power pick-up point; and the at least one electric motor is configured to receive power from the at least one power pick-up point.

In the system, the at least one motorized trolley can comprise at least one helical bevel gearbox. The at least one motorized trolley can comprise a plurality of load wheel assemblies. The chassis/beam can comprise at least a four-corner locking pin mechanism configured to lift and hold the object.

In the system, the object can comprise a shipping container.

In the system, the at least one motorized carrier comprises a king pin configured to couple the at least one motorized trolley to the chassis/beam, bumper and deflection system.

In the system, the further comprising a control system configured to control operation of the at least one motorized carrier.

A motorized carrier configured to travel along a suspended railway comprises:
- at least one motorized trolley configured to move the at least one motorized carrier along the suspended railway;
- a chassis/beam configured to carry an object below the motorized trolley; and
- a bumper and deflection system configured to prevent the object from adversely contacting an object on the suspended railway.

In the foregoing motorized carrier, the at least one motorized trolley can comprise:
- at least one motor;
- a plurality of wheels configured to ride along the suspended railway/track; and
- a connection-flange point for each of the plurality of wheels that connects the wheel to the at least one motor through at least one gear box.

The at least one motorized carrier can comprise at least one electric motor. The at least one electric motor can comprise a regenerative power system. The suspended railway can comprise at least one power pick-up point and the at least one electric motor is configured to receive power from the at least one power pick-up point.

In the foregoing motorized carrier, the at least one motorized trolley comprises at least one helical bevel gearbox. The at least one motorized carrier can comprise a plurality of load wheel assemblies. The chassis/beam comprises a four-corner locking pin mechanism configured to lift and hold the load. The load can comprise a shipping container. The at least one motorized carrier can comprise a king pin configured to couple the at least one motorized trolley to the chassis/beam, bumper and deflection system.

A method of carrying an object comprises:
(a) picking up, with a chassis/beam of a motorized carrier configured to travel along a suspended railway, the object;
(b) moving, with at least one motorized trolley, the at least one motorized carrier along the suspended railway;
(c) preventing, with a bumper and deflection system, the object from adversely contacting another object on the suspended railway; and
(d) setting down the object at a destination.

The foregoing method can further comprise selectively directing, with at least one elevated switch, the at least one motorized carrier to different portions of the suspended railway. The method can further comprise receiving power, with at least one electric motor of the motorized trolley, from at least one power pick-up point of the suspended railway.

In the foregoing method, the load comprises a shipping container. The method can further comprise managing and controlling, with a control system, operation of the motorized carrier.

In some embodiments, an overhead transport system can comprise a suspended railway; a motorized carrier configured to travel along the suspended railway; and/or a control system configured to control operation of the motorized carrier. In some embodiments, the suspended railway is a single elevated rail. In other or the same embodiments, the suspended railway includes a steel rail and/or an elevated switch configured to selectively direct the motorized carrier to different portions of the suspended railway.

In some embodiments, the motorized carrier can include a motorized trolley configured to move the motorized carrier along the suspended railway; a carrying structure configured to carry a container below the motorized trolley; and/or a bumper and deflection system configured to prevent the container from contacting a second container.

In some embodiments, the motorized trolley can include a motor; a plurality of load wheels configured to ride along the suspended railway; a gearbox; and/or a connection-flange point for connecting each of the plurality of wheels to the motor.

In some embodiments, the motor is electric. In certain embodiments, the motor comprises a regenerative power system. In some embodiments, the suspended railway has a power pick-up point from which the electric motor is configured to receive power.

In some embodiments, the carrying structure has a four-corner locking pin mechanism configured to lift and hold the container. In some embodiments, the container is an intermodal container.

A method of carrying a container can comprise picking up, with a carrying structure attached to a motorized carrier configured to travel along a suspended railway, the container; moving, with the motorized trolley, the motorized carrier along the suspended railway; preventing, with a bumper and deflection system, the object from contacting a second container on the suspended railway; setting down, the container at a destination; selectively directing, with an elevated switch, the motorized carrier to different portions of said suspended railway; receiving power, with a motor of the motorized trolley, from a power pick-up point of the suspended railway; and/or controlling, with a control system, operation of the motorized carrier.

DETAILED DESCRIPTION OF PREFERRED EMBODIMENT(S)

An overhead transport system and route management system can be employed to unload (and correspondingly load) shipping containers from (and to) dockside ships, working in harmony and in concert with the pace of operation of ship-side gantry cranes, to improve operations while reducing backlog, reducing port congestion and reducing port pollution.

Figure 1:
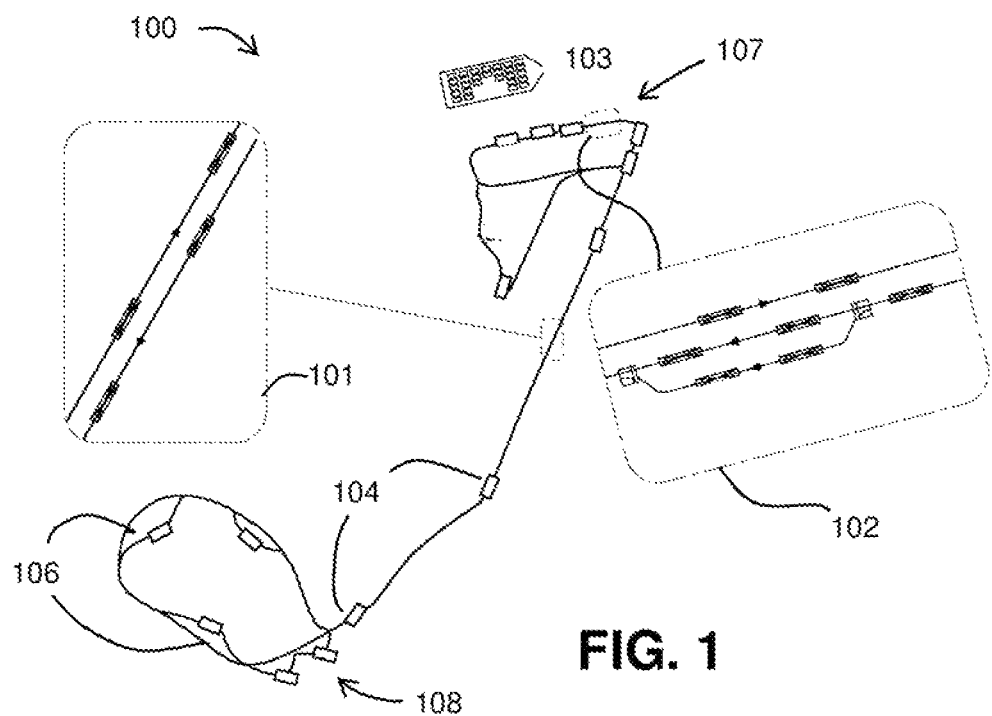
FIG. 1 is a schematic diagram showing an overhead transport system and route management system for transporting shipping containers from one location in a port, terminal or warehouse facility to other location(s).

FIG. 1 shows an overhead transport system and route management system 100 for transporting shipping containers from one location in a port, terminal or warehouse facility to another location. In FIG. 1, the principal elements include suspended overhead monorail 101, inbound/outbound shipping area 107, synchronizable motorized carriers 104, and off-site depot with points of pickup 106. As shown in the enlarged portion, overhead monorail 101 can be a dual track. In shipping area 107, ships (one of which is shown as ship 103) are unloaded via existing port gantry and unloading mechanisms, and the containers are placed on load platforms, which can shuttle and lift containers up to the overhead monorail transport system. As shown in the other enlarged portion 102, multiple lanes of overhead monorails provide enhanced throughput to keep pace with loading and unloading sequencing and scheduling.

Containers are transported via motorized carriers 104 suspended on overhead monorail structure 101. Motorized carriers 104 with containers are independently guided to designated drop-off areas. Container drop-off areas, one of which is shown as area 108, are located to provide relief to the port area and are points of further distribution, thereby reducing port congestion and container backlog while reducing the use of over-the-road vehicles to transport containers between port areas.

From drop-off area 108, loaded containers are loaded onto overhead monorail 101 and returned to the port area or other intermediate drop-off location. Motorized carriers 104 transport loaded containers from drop-off area 108 back to shipping area 107. If the carrier is not loaded, then an empty carrier (no container attached) returns from drop-off area 108 and is queued up to receive a container from ship 103 or ship area 107, where the pick-up and delivery process repeats.

Turning now to FIGS. 2A-2D, overhead motorized carrier 119 propels and delivers shipping container 116 along rail/track 113 which is supported by integrated truss 112. Motorized carrier 119 includes motorized trolley assembly 114 and chassis 118, as well as front bumper 115 and rear bumper 117. It should be noted that chassis 118 can be replaced with a beam or beams (not shown). A motorized carrier using a beam is within the scope of this disclosure, and performs essentially the same way as a carrier utilizing chassis 118. For convenience, the term chassis will be used to mean a carrying structure including attachment beams or a chassis where either beams or chassis can be used.

Motorized trolley assembly 119 can be a self-propelled, but remotely controlled drive system that moves the containers along rail/track 113. Each carrier can have two motorized trolley assemblies 114; these two motorized trolleys per carrier can be controlled synchronistically. Each motorized trolley can have multiple drive wheels (see FIGS. 3A-3D and 4) with corresponding connection-flange points for various-sized electric motors. Example embodiments of motorized trollies can include, 1 through 10 drive wheels. Motor size and motor count-configuration can be based on the needs of specific system installations. Each motorized trolley assembly 114 can accommodate from one-to-four motors (one per wheel) to match power needs and failure and redundancy ratings. Each motor can be geared for variable speeds and traction efficiencies and the ability to travel in both directions.

A bumper-and-bumper support and deflection structure can be hung from the bottom of the two motorized trolleys via one king pin and can connect to chassis 118 beneath it. This structure includes three principal elements: (1) connection points between the motorized trolleys, (2) chassis, strength, stability and anti-torsion and anti-flex in the carrier system itself, and/or (3) bumper and deflection protection so containers cannot strike each other and are kept apart to prevent container collisions and carrier damage, as well as facilitating safety-rated weight distribution on the overhead rail. There can be a front and a rear bumper on all carriers with shock absorption rubber or similar material with shock absorption properties.

The chassis portion 118 of overhead motorized carrier 119 can connect directly to the international shipping containers using the industry standardized four-corner pin locking system.

In some embodiments, chassis 118 has three main portions: a center section that can be connected to the bumper-and-bumper support and deflection frame above it, two opposing armatures that can extend out of the center section and are telescopically adjustable to fit standard sized of international shipping containers, and the corner locking pins (one at each corner).

Figure 2A:
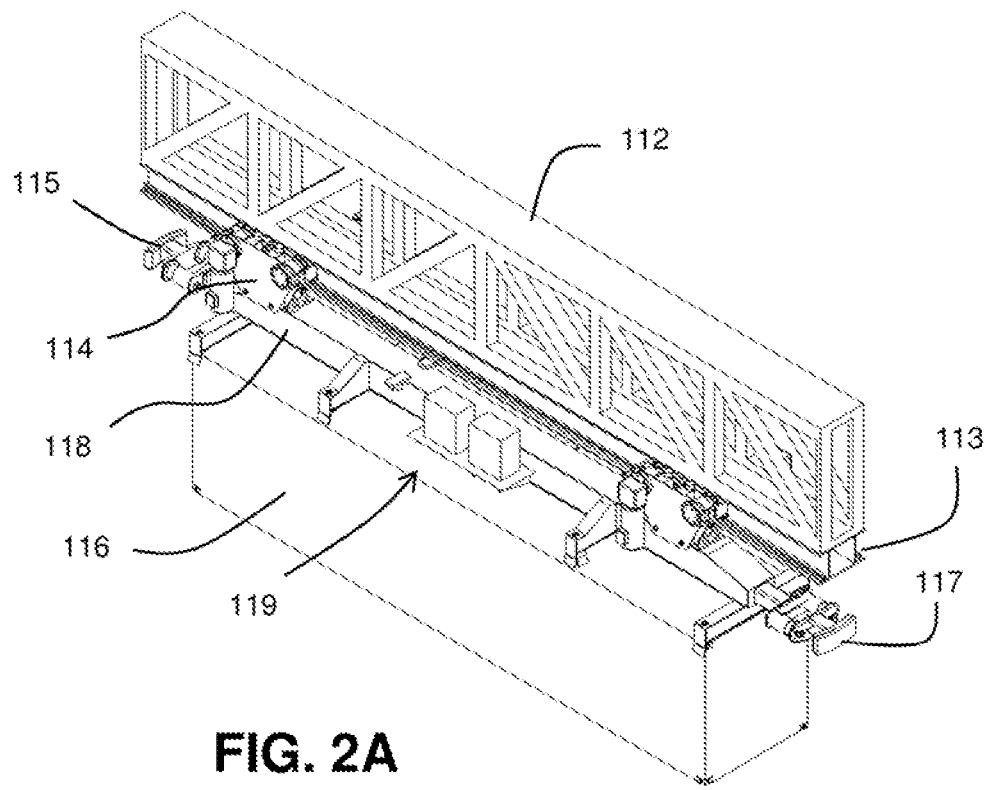
FIGS. 2A, 2B, 2C and 2D are isometric, top, side elevation and end elevation views, respectively, of the overhead motorized carrier structure that propels and delivers a shipping container along the integrated suspended rail.
Figure 2B:
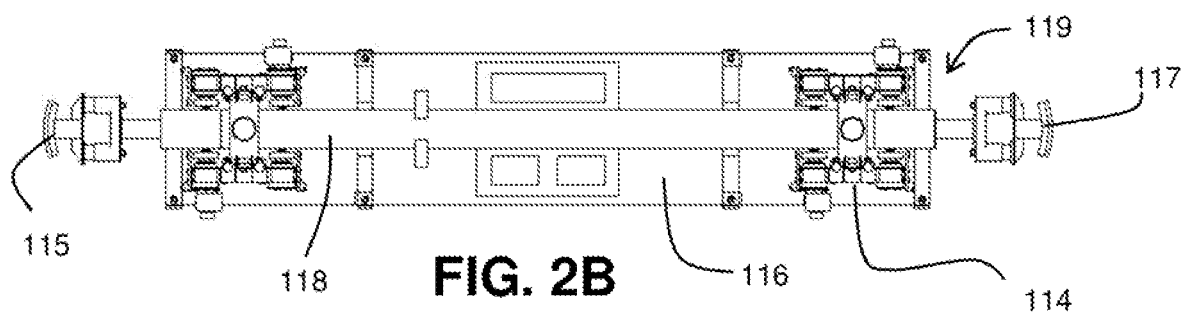
Figure 2C:
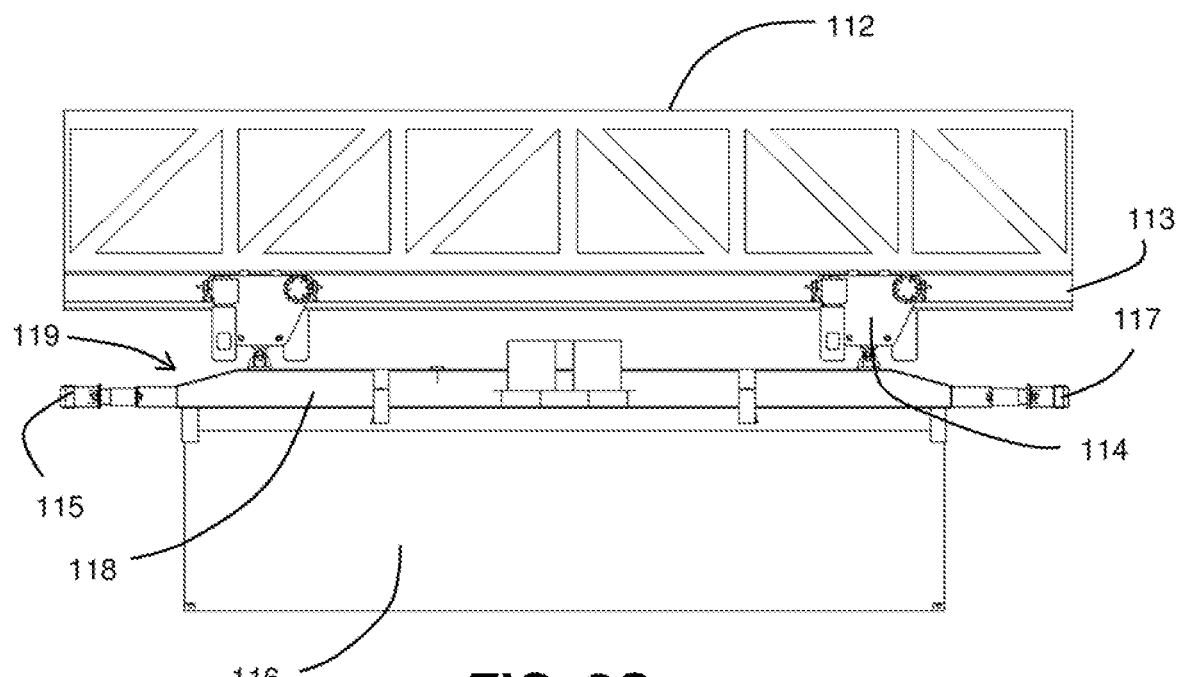
Figure 2D:
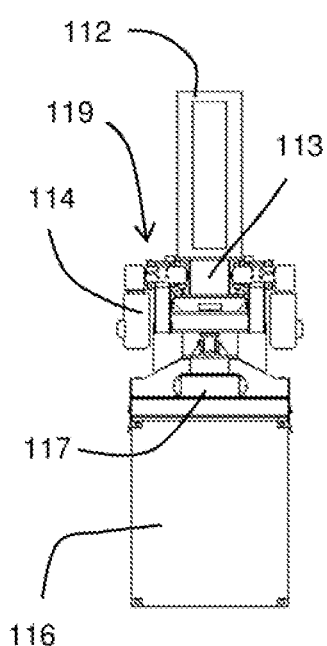
Figure 3A:
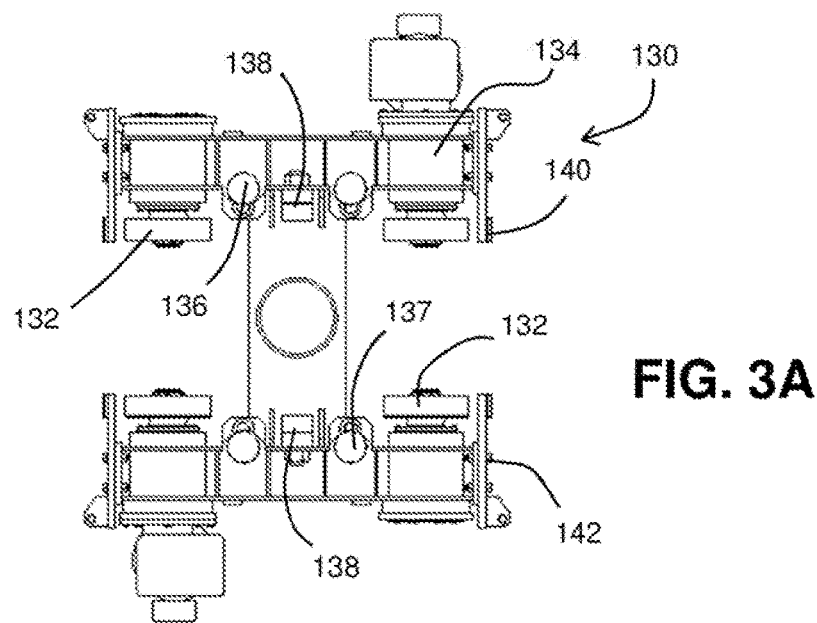
FIGS. 3A, 3B, 3C and 3D are top, side elevation, end elevation and isometric views, respectively, of the motorized trolley assembly of an overhead transport system and route management system.
Figure 3B:
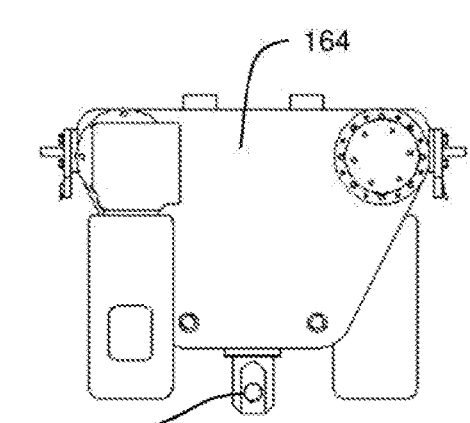
Figure 3C:
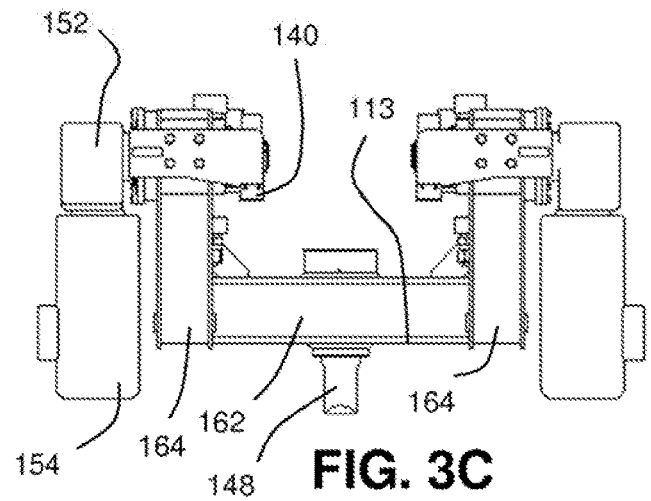
Figure 3D:
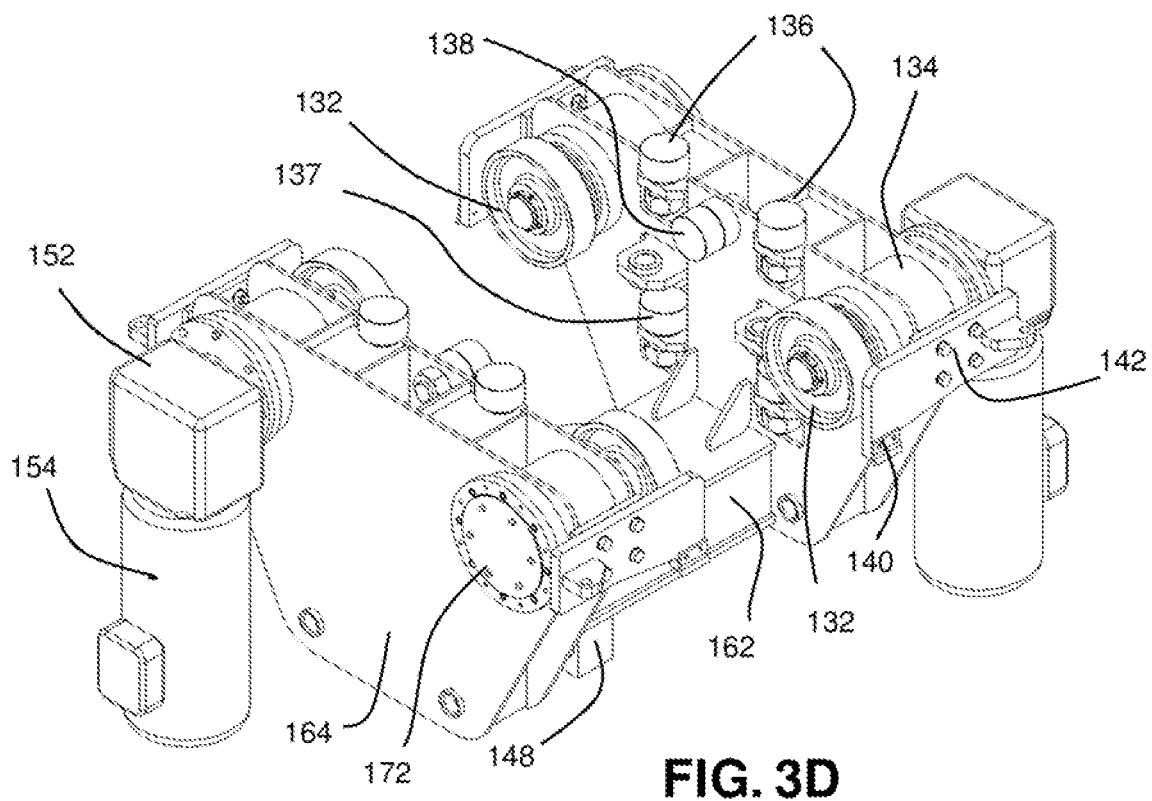

FIG. 2A more particularly depicts main truss-based overhead rail/track 113, which can have a flange area that utilizes the lower portion of the track which can be where the motorized trolley load wheels (see FIGS. 3A-3D and 4) create drive friction for propulsion. A sub-rail can be positioned on the rail/track flange. The sub-rail can interface with the friction load wheels.

FIGS. 3A-3D show the motorized trolley assembly 130 of an overhead transport system and route management system. Motorized trolley assembly 130 is the propulsion device for an overhead transport system. As shown in FIGS. 3A-3D, motorized trolley assembly 130 includes support frames 164 with cross beam connectors 162, motors 154, helical-bevel gearbox 152, load wheels 132, top guide wheels 136 and bottom guide wheels 137, anti-tilt guide wheels 138, king pin 148, and rail/track sweep 140. In some embodiments, motor 154 is electric. Load wheels 132 extend from load wheel assembly tube 134.

The side-by-side, parallel trolley support frames 164 and interconnecting cross support beam 162 are the main structural elements of the motorized trolley assembly. Support frames 164 can be constructed from steel plating, with a cross beam fabricated from built-up structural shapes, with tolerances that assure that bolted-on subcomponents are tight and aligned. Exposed steel can be coated for anti-corrosion and anti-rusting.

Motors 154 can be specified in accordance with the specific system application, and can incorporate an internal braking mechanism, as well as an energy recapture system from the braking function. In some embodiments, there can be between one and ten motors per carrier. In some embodiments there are 2, 4, or 8 motors per carrier. Each trolley assembly 130 can have a flange portal to connect each load wheel to a motor. Motors 154 can be mounted vertically (as shown) or in another orientation such as horizontally. Mounting motors 54 vertically creates a narrow trolley profile. The power transfer from the motor shaft to the load wheel can be directed through a bevel gearing system. Motors 154 can have a bolt-on design for ease of replacement.

In embodiments where motors 154 are electric, they can receive their electrical power-feed from power pick-up points installed on the main rail itself. These electrified power strips can have a corresponding and aligned power pick-up point on each motorized trolley assembly 130 for power transfer into the motors and for shedding captured power/regeneration back into the system during braking and rail decline sections.

As further shown in FIGS. 3A-3D, helical bevel gearbox 152 connects the drive shaft of electric motor 154 to the axle of a load wheel 132, through a beveled gearing system that can transfer power through a 90-degree change in direction. Gearbox 152 can have several gearing ratios so that minimal motor effort can create maximal torque during the various requirements of initial acceleration to running speed to deceleration. Beveled gearbox 152 can have a bolt-on design for ease of replacement and servicing.

Load wheels 132 can include a shaft and bearing design manufactured with high-grade alloys for long lasting wear/life cycles. The load wheel friction surface can be either carbon steel surface for high demand applications or a synthetic surface for lower noise and better traction applications.

Motorized trolley assembly 130 can have a series of multiple guide wheel sets that keep the main load wheels in an optimal relationship for friction, alignment and leveling with the main truss-design rail/track and sub-rail for the tracking and propulsion. The embodiment shown has three sets of guide wheels. There can be four top guide wheels 136 that keep the top of the housing aligned to the rail, four bottom guide wheels 137 that keep the lower portion of the housing aligned to rail/track 113. Two anti-tilt wheels 138 keep motorized trolley assembly 130, and therefore the overall motorized carrier system, from swaying or tilting side-to-side when load-shifting occurs.

King pin 148 is the main connection mechanism between motorized trolley assembly 130 and the trolley frame or end beam if no chassis. King pin 148 can be a flanged head pin design that extends from the top to the bottom of cross support beam 162. As a free element, king pin 148 can rotate within the allotted passageway and can absorb some vertical forces. The lower end of king pin 148 can have a full-circle, eyelet-designed opening through which a secondary pin can be placed, thus joining it with a looped eyelet on the top of the frame structure. The system is designed to hook and unhook quickly for service and maintenance.

Wheel clean-sweep plates 140 can be mounted on plate 142 in front of each load wheel 132 and can provide for continuous removal of obstructions or debris that can accumulate inside the lower flanges of rail/track 113, and specifically on the smaller drive rail upon which load wheels 132 can roll. The portion of clean-sweep plate 140 that moves over rail/track 113 can itself be covered with a replaceable and serviceable high-density, synthetic material to prevent metal-on-metal friction and resulting noise. Wheel clean-sweep plates 140 can also incorporate non-adhesive properties that allow for improved discharge of debris collected on the face of sweep 140.

Figure 4:
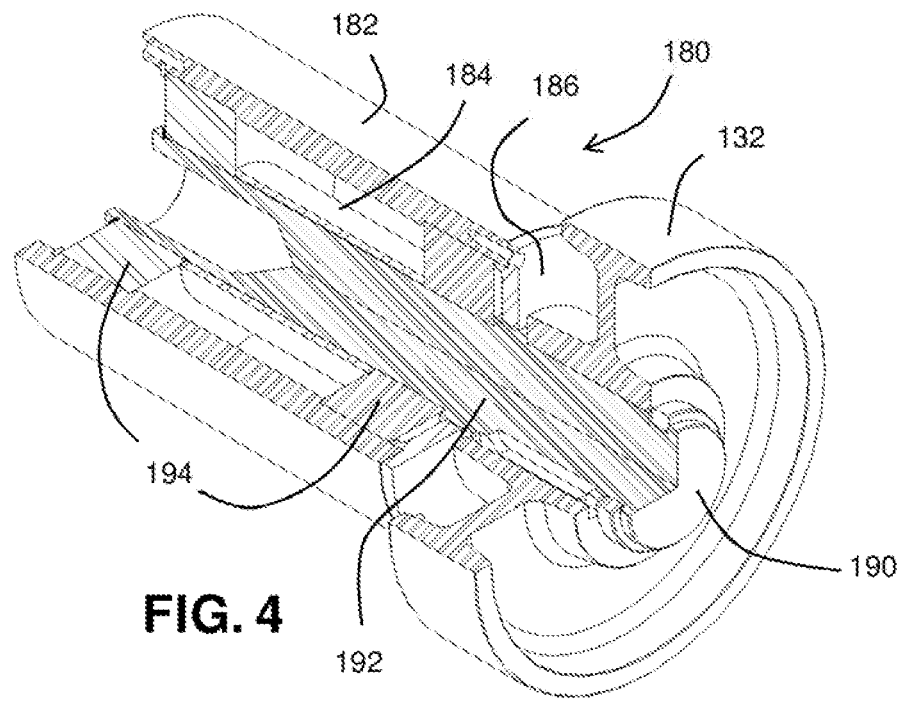
FIG. 4 is an isometric view, partially in section, showing the load wheel of the motorized trolley assembly illustrated in FIGS. 3A-3D.

FIG. 4 further illustrates load wheel assembly 180. In some embodiments, there are four load wheel assemblies per motorized trolley assembly 130 and eight per motorized container carrier. Load wheel assembly 180 can be designed to be easily removed from trolley assembly 130 for maintenance and/or replacement via a bolt-on retaining flange. Load wheel assembly 180 can be either free-wheeling or powered by a motor/drive assembly such as motor 154. There can be several powered wheels per motorized trolley assembly 130. In some embodiments, there are ten powered wheels per motorized carrier.

The primary component of load wheel assembly 180 is load wheel 132. Load wheel 132 can ride on a crane rail 318 that transfers the container/motorized carrier load to the monorail support structure (see FIGS. 7A and 7B). Load wheel 132 can have an outside diameter of 400 mm and can be made of flame hardened forged carbon steel. Load wheel 132 can be attached to an AISI 4140 alloy normalized steel shaft, which can be press fitted into a cylindrical roller bearing assembly 194. Load wheel 132 can be secured to shaft 192 via a carbon steel end cap 190 fastened with tapered head machine screws.

As further shown in FIG. 4, cylindrical roller bearing assembly 194 includes two high speed roller bearings 194 at each end fitted into a bearing support tube 182. The support tube can have carbon steel walls with end covers 186 that are fastened at both ends via machine screws.

FIGS. 5A-5D illustrate the truss and rail structure that supports 60 tons (54.4 metric tons) carriages in winds up to 120 miles per hour (193 kilometers per hour), and allows the motorized carrier to move synchronously around the track. There are two primary rail support structures shown: single truss structure 210 and double truss structure 220.

Figure 5A:
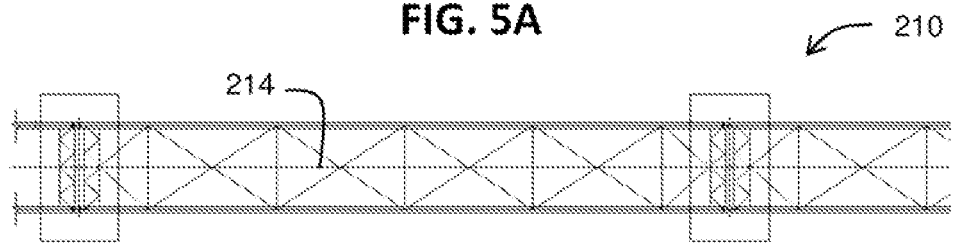
FIGS. 5A and 5B are top and side elevation views, respectively, of a single truss design of the overhead monorail structure of an overhead transport system and route management system.
Figure 5B:
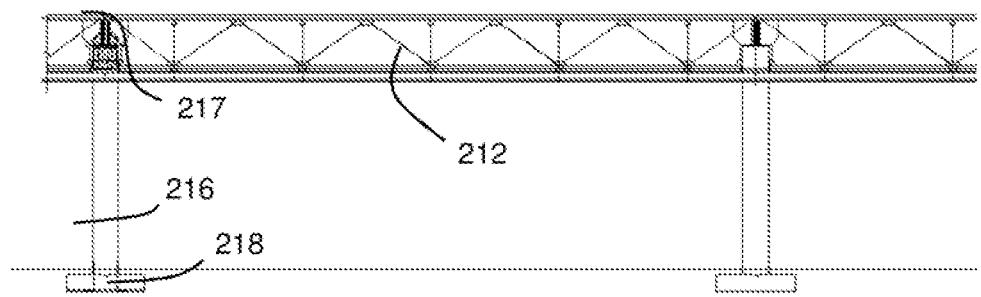

FIGS. 5A and 5B show a single truss structure in which the track is trussed in two different dimensions. Primary truss assembly 212 can be constructed of the angle irons shown in the elevation. Primary truss assembly 212 can support the vertical force of the container and carrier assembly. Transverse stresses induced by winds, unbalanced loads and turns, can be stabilized by a secondary cross-bracing 214, which stabilizes the two primary trusses. Truss assembly 210 can be constructed out of varying thicknesses of steel plate.

Figure 5C:
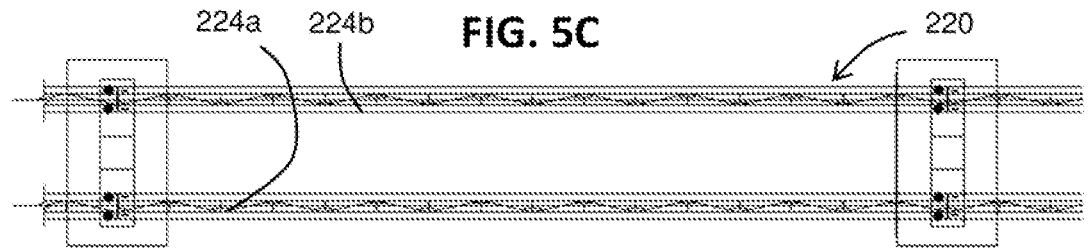
FIGS. 5C and 5D are top and side elevation views, respectively, of a double truss design of the overhead monorail structure of an overhead transport system and route management system.
Figure 5D:
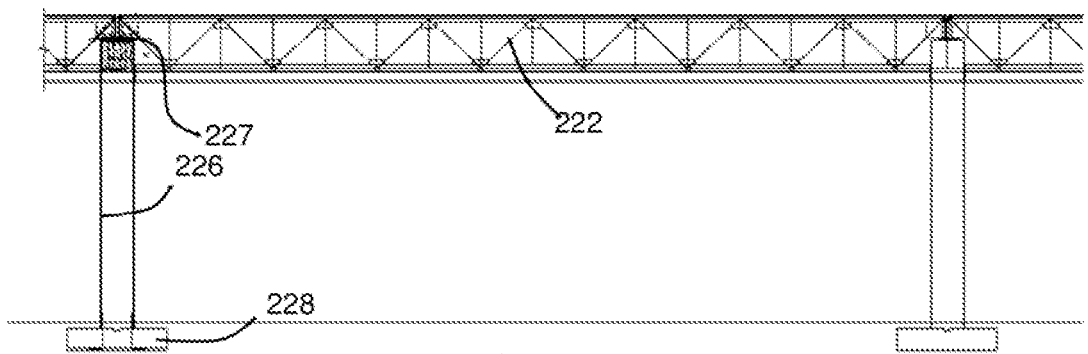

FIGS. 5C and 5D show a double truss structure in which primary trusses, one of which is shown as truss 222, can support the vertical force of the container and carrier assembly. Transverse stresses induced by winds, unbalanced loads and turns, can be stabilized by secondary truss assemblies 224*a* and 224*b*, which stabilize the two primary trusses 222. Truss assembly 210 can also be constructed out of varying thicknesses of steel plate.

Single truss assembly 210 can be engineered to support several back-to-back carriers with fully loaded 45-foot (13.7 meter) containers and 65 tons (58 metric tons).

In each of the single and double truss structures, the main supporting column 216 and 226, respectively, can be a concrete pillar constructed with reinforcing steel. The height of the column can vary depending on the clearance. Columns 216 and 226 can be supported with footing slabs 218 and 228, respectively. The long side of the footing slab can be set perpendicular to the direction of the rail and in line with the supporting column so that it extends beyond each of the rails in a double-rail section.

Figure 6A:
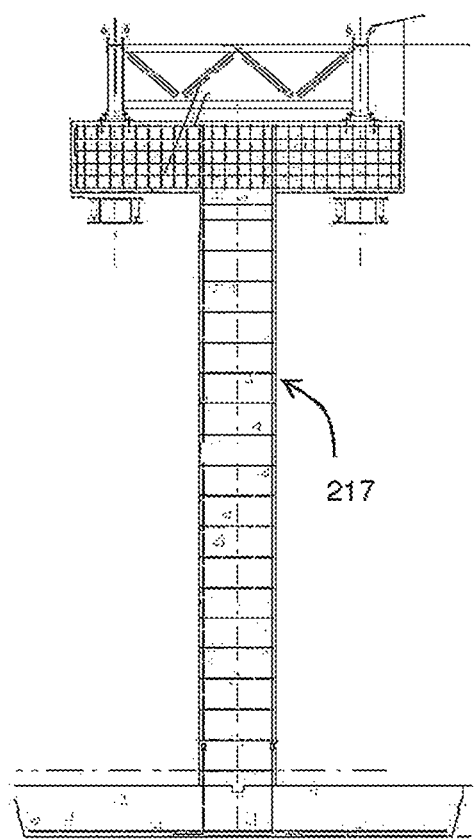
FIG. 6A is an end elevation view of the support column for the single truss design of the overhead monorail structure illustrated in FIGS. 5A and 5B.
Figure 6B:
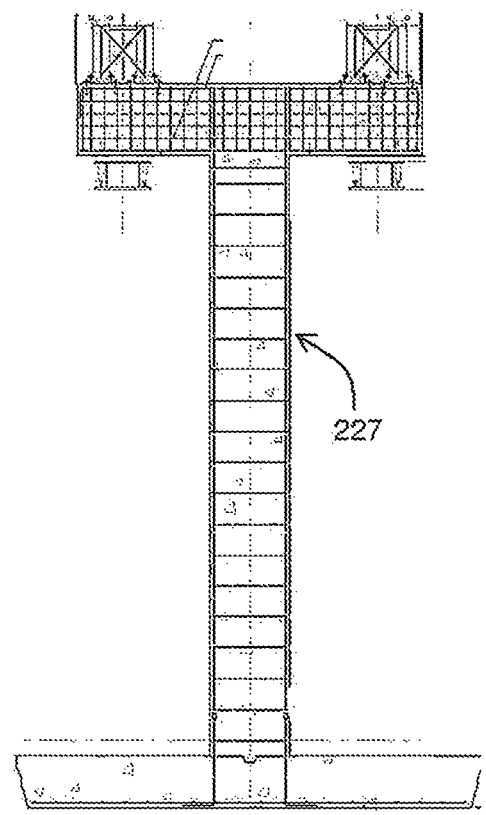
FIG. 6B is an end elevation view of the support column for the double truss design of the overhead monorail structure illustrated in FIGS. 5C and 5D.

As further shown in FIG. 6A (single truss design) and FIG. 6B (double truss design), support columns 217 and 227 support two sets of truss girders. The horizontal spar portion of 217 and 227 can be constructed as a single entity within the supporting columns. The rail on which the carrier rides can be suspended below the horizontal spars, and at the spar, the rail can be bridged beneath it by the strength of the steel in the rail portion of the truss assembly.

Figure 7A:
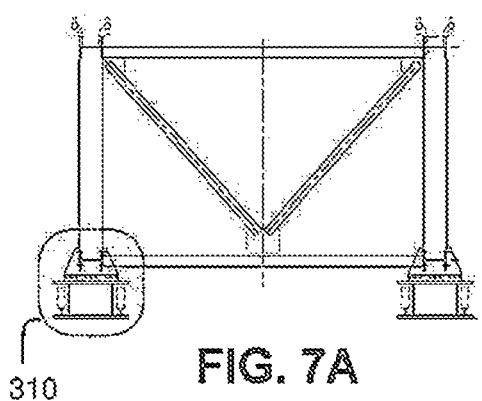
FIG. 7A is an end elevation view of the rail support structure for the single truss design of the overhead monorail structure illustrated in FIGS. 5A and 5B.
Figure 7B:
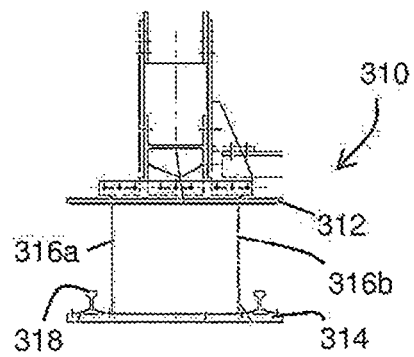
FIG. 7B is an enlarged end elevation view of the rail support portion circled in FIG. 7A.
Figure 7C:
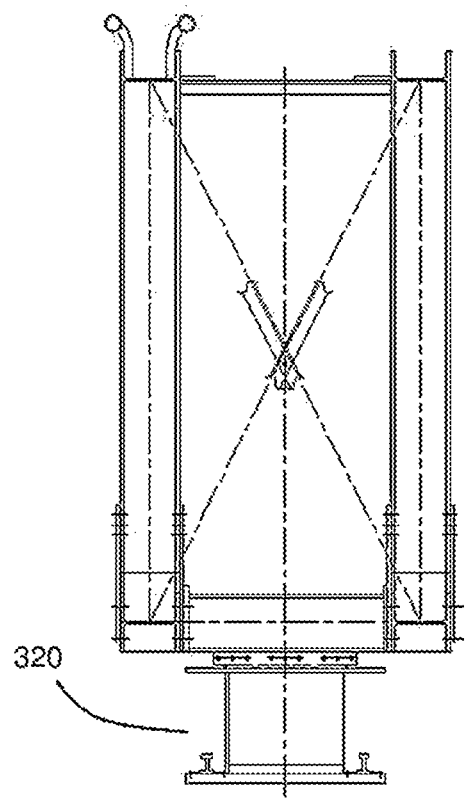
FIG. 7C is an end elevation view of the rail support structure for the double truss design of the overhead monorail structure illustrated in FIGS. 5C and 5D.

FIGS. 7A-7C illustrate truss and rail assemblies for an overhead transport system. FIG. 7A shows truss and rail assembly 310 for a single truss design. FIG. 7C shows truss and assembly 320 for a double truss design. FIG. 7B is an enlarged view of the rail structure on which the wheels of the motorized carriers ride. The double I-shape that forms the riding structure for the carriers includes a top plate 312, a bottom plate 314 and a pair of vertical walls 316*a* and 316*b* extending between top plate 312 and bottom plate 314. These components can be welded into place before being lifted to the spar and bolted into place. A rail 318 is welded onto the bottom flange. The wheels of the motorized carrier will ride on rail 318. In some embodiments, the rail/track can include standard steel shapes such as wide flanges and I-beams. As shown in FIG. 7C, truss and rail assembly 320 for the double truss design is configured analogously to that of the single truss design illustrated in FIGS. 7A and 7B. FIGS. 7A and 7C also show the lateral bracing associated with the truss designs.

Figure 8A:
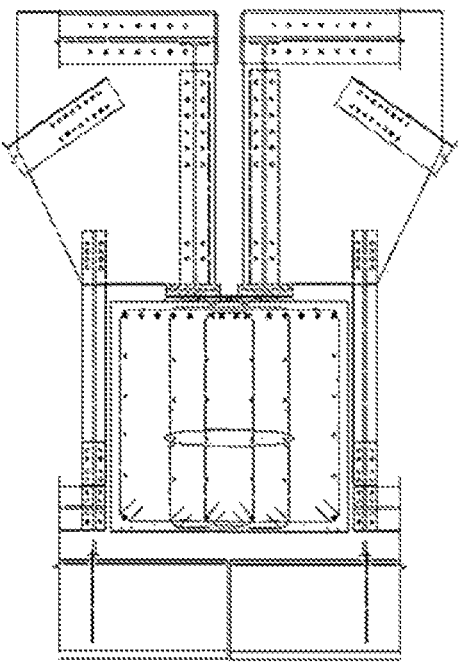
FIG. 8A is a side elevation view of the truss-to-column connection for the single truss design of the overhead monorail structure illustrated in FIGS. 5A and 5B.
Figure 8B:
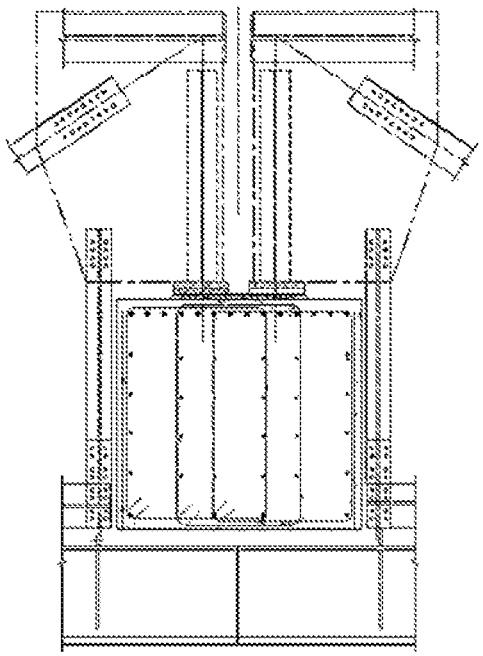
FIG. 8B is a side elevation view of the truss-to-column connection for the double truss design of the overhead monorail structure illustrated in FIGS. 5C and 5D.

FIGS. 8A and 8B illustrate the bracing of the trusses at the interface with the supporting spar. The angle irons of the truss system can connect at the spar junction at the upper end of the truss, thereby maximizing the load and minimizing the impact of the cut-away around the spar.

Turning now to FIGS. 9A-9D, sliding track switch 350 includes fixed frame 352, wheels 354, interior frame 356, first track section 358, second track section 360, and motor 362. Fixed frame 352, interior frame 356, first track section 358 and second track section 360 can be made from fabricated steel parts that are welded together.

Figure 9A:
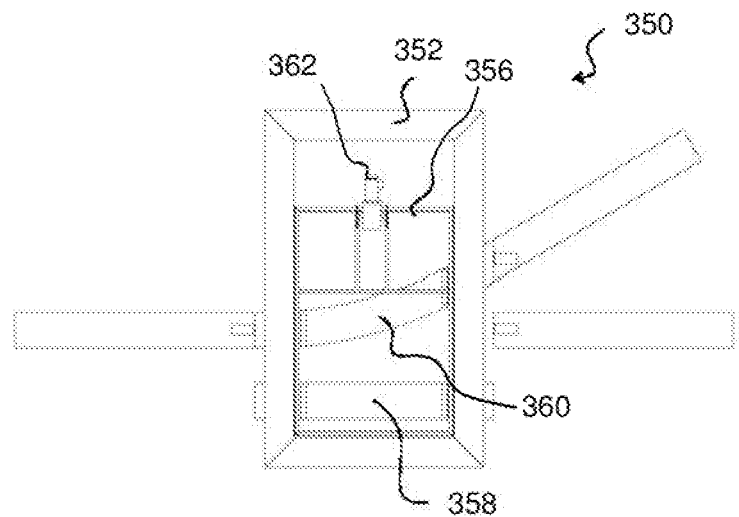
FIGS. 9A, 9B, 9C and 9D are top, isometric, side elevation and end elevation views, respectively, of a track switch for an overhead transport system and route management system.
Figure 9B:
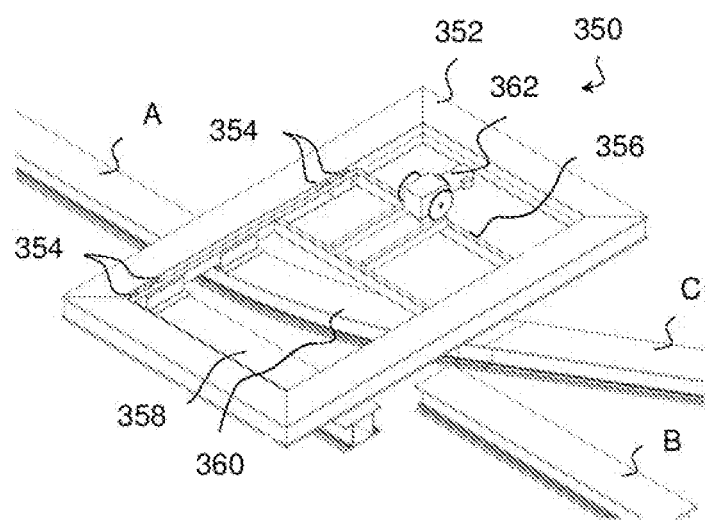
Figure 9C:
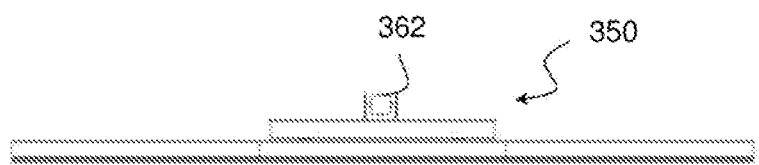
Figure 9D:
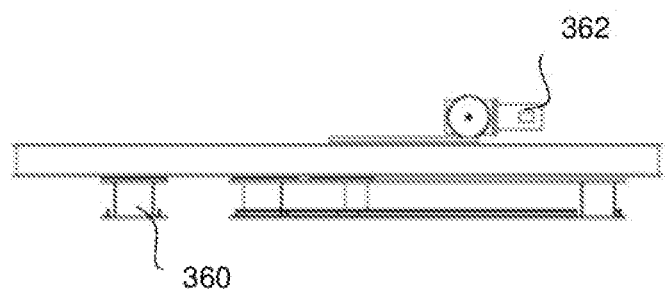
Figure 10A:
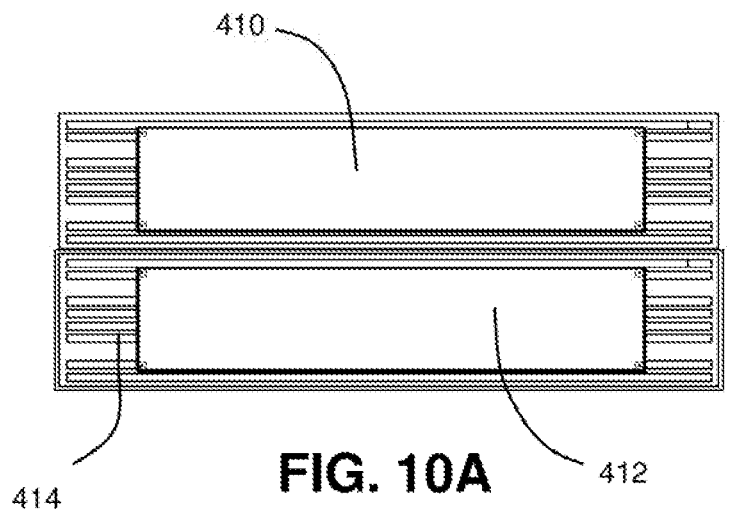
FIGS. 10A, 10B, 10C and 10D are top, isometric, side elevation and end elevation views, respectively of a container loading device for an overhead transport system and route management system.
Figure 10B:
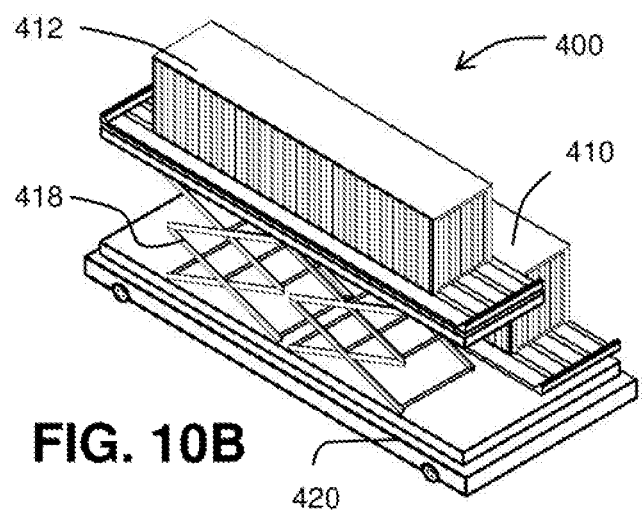
Figure 10C:
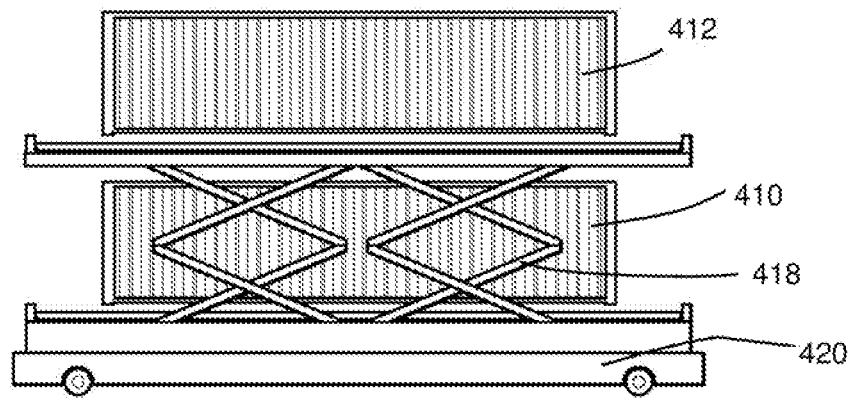
Figure 10D:
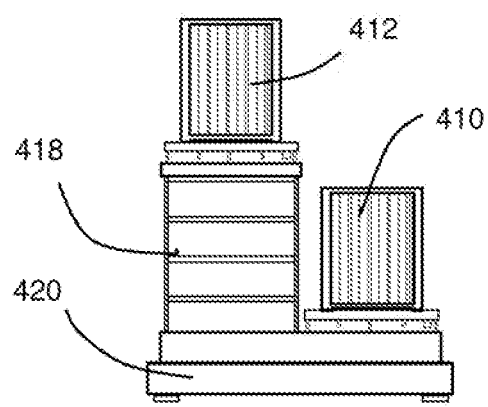

Track sections A, B and C are shown in FIG. 9B. Taken together, track section A and track section B make rail line AB. Taken together, track section A and track section C make rail line AC.

In some embodiments, fixed frame 352 is stationary while interior frame 356 is configured move to via wheels 354 when motor 362 rotates such that the position of first track section 358 and second track section 360 relative to track sections A, B and C can be changed.

In FIGS. 9A-9D, interior frame 356 can be moved from a first position to a second position, as specifically shown in FIG. 9A. In the first position (not shown) interior frame 356 is positioned such that first track section 358 aligns with track section A and track section B. This configuration allows a carrier to move from track section A to track section B and vice versa. The carrier can be motorized.

In the second position (shown in FIGS. 9A and 9B) interior frame 356 is positioned such that second track section 360 aligns with track section A and track section C. This configuration allows a carrier to move from track section A to track section C and vice versa. There can be more than two track sections in interior frame 356 and/or more than two rail lines.

As shown, interior frame 356 is moved via wheels 354 and motor 362. Motor 362 is typically an alternating current electric motor. Motor 362 can also be hydraulic or pneumatic horizontal actuators, or an internal combustion engine, and can also be controlled wirelessly.

Sliding track switch 350 is configured to communicate with a system to signal the current position of interior frame 356. Magnet proximity switches can be used to indicate the position of interior frame 356. The information can then be relayed to carriers. This is important so that the carriers do not try to enter frame 352 when interior frame 356 is between the first and second position. Sliding track switch 350 could also communicate wirelessly with the system. Sliding track switch 350 could also communicate directly with the carriers.

As further shown in FIGS. 9A-9D, sliding track switch 350 is configured to move interior frame 356 when carriers (including a carrier with cargo) is located on first track section 358 and/or second track section 360. When first track section 358 or second track section 360 are far enough apart, two carriers traveling in opposite directions can pass each other on the same track. One carrier simply waits on either first track section 358 or second track section 360 while the other carrier passes by on the unoccupied track section.

Sliding track switch 350 can also act as a lift to shift carriers in an upward or downward direction. Sliding track switch 350 can also shift carriers in a diagonal direction.

FIGS. 10A-10D show a container loading device 400 suitable for an overhead transport system and route management system. Container loading device 400 includes a mobile platform 420, a container 410 positioned by a crane (or other container transfer device/vehicle), another container 412 being lifted vertically by a scissor lift 418. A set of rollers 414 facilitate the transfer of container 410 from its initial position to a position atop scissor lift 418.

For an example "load" cycle, loading device 400 can position the container below overhead motorize carrier 119 such that the locking pins of carrier 119 align and latch to the container. Similarly, for an "unload" cycle, loading device 400 (positioned below carrier 119) can, relieve the load from motorized carrier 119 by unlatching the locking pins, and safely removing (lower) the container from motorized carriers 119.

Figure 11:
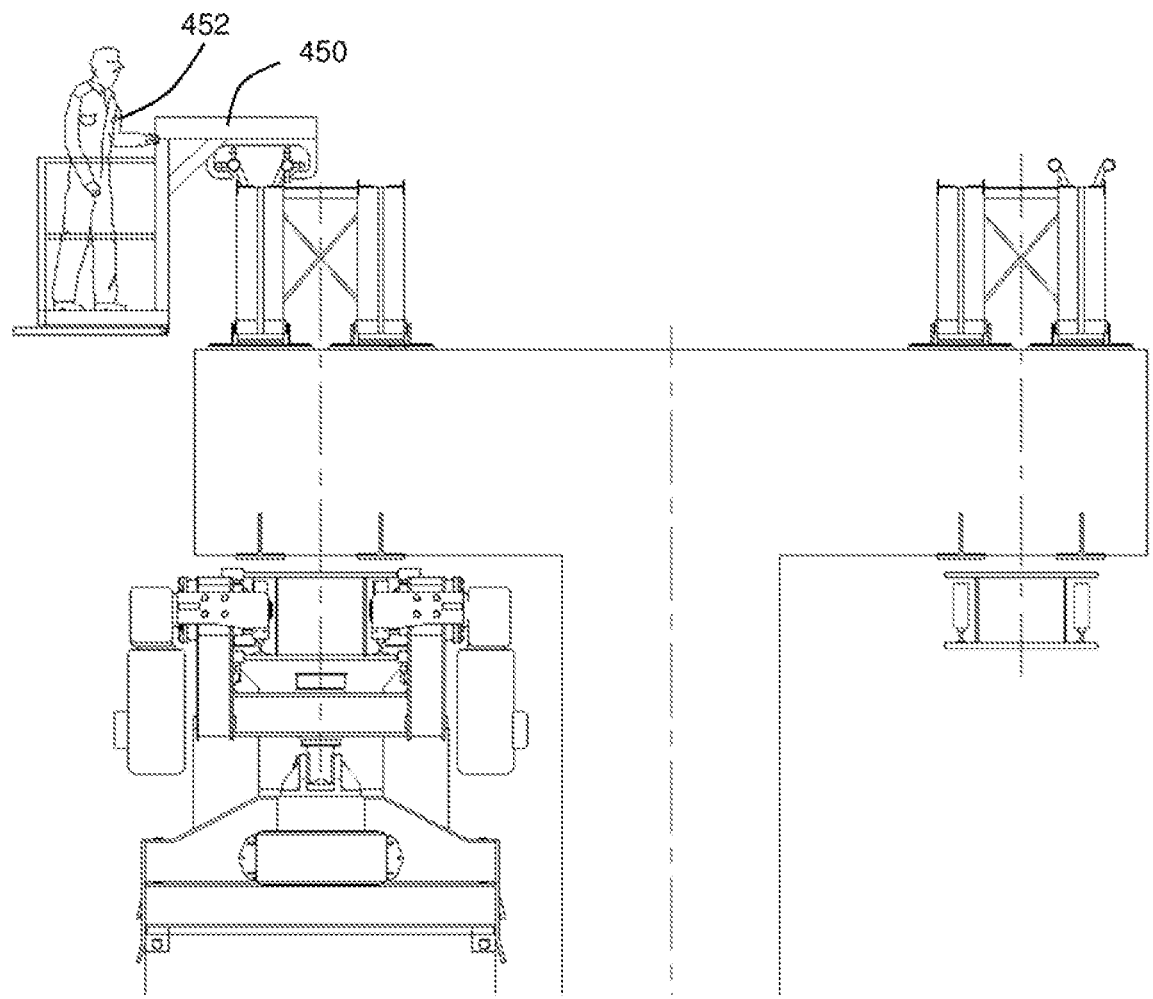
FIG. 11 is an end elevation view of a maintenance cart for an overhead transport system and route management system.

FIG. 11 is an end elevation view of a maintenance cart 450 for an overhead transport system and route management system. FIG. 11 also depicts a maintenance worker 452 operating maintenance cart 450, as well as the position of motorized carrier 119.

The main mechanical structure of a system can be a multi-tiered, multi-tracked, suspended monorail system. Rails can typically be hung from horizontal spars capping support columns. Loaded motorized carriers (with containers), and unloaded motorized carriers (without containers) can travel on the suspended monorail system.

The motorized container carriers of a system can be a self-propelled, zero-emission, electrically driven carrying structure that increases, if not maximizes, movement efficiency, and reduces shipping ecosystem pollution contribution.

Control System Description

The Container Logistics System can consist of an overall scheduling and control system that can control the movement of the motorized carriers throughout the entire system. This can include receiving individual container data that will be used to direct the containers destination to/from the ships, shipping areas, and terminals. The scheduling and control software can control the operation of the various components of the system including lift tables, track switches, mobile on ground carriers and the interface to the control system on each motorized carrier.

The scheduling software can be responsible to receive information of what containers are being unloaded off each ship/transporter and on the containers being loaded onto each ship/transporter. This interface can be automatic or manual depending on the control system in place at each location. The scheduling software can then use this information to dynamically control the motorized carrier throughout the system, looking ahead to optimize the sequence of track switches, routes, load and unload stations.

Each motorized carrier can include an on-board control system, which can be responsible for controlling the drive motors including accelerate/decelerate carrier operations as well as indexing, locking systems, container in place sensors and distance meters. This motorized carrier control system can also communicate to the overall control system to report system operating parameters.

Inputs/outputs: The Schedule and Control System can receive information regarding operator commands, carrier dispositions, the operating environment and information about the containers.

Operator Commands: Typical operator commands can include: retrieval of a specific container, setting a container's destination, changing a container's destination, inputting a list of containers to get in next time increment, sending a motorized carrier to maintenance (namely, removing it from active duty), retrieving motorized carrier from maintenance back to active duty, sending and retrieving a motorized carrier to and from customs, moving a motorized carrier to nearest "holding" track, returning a motorized carrier to its pick-up origin station (for example, correcting a routing error), moving idle motorized carrier(s) to new locations for system load balancing, lifting and setting a motorized carrier at specific lift station, emergency stop, changing the system's motorized carrier maximum speed, and changing minimum allowable distances between motorized carriers.

Motorized Carrier Dispositions: Typical motorized carrier disposition information can be: the motorized carrier's current location in the system, the direction of the motorized carrier's movement, its current velocity, and motorized carrier's speed relative to adjacent motorized carrier in either direction, measurement of strain, load status, i.e. whether an motorized carrier is carrying a loaded container, and empty container, or is idle (namely, is not carrying a container), motorized carrier motor rpm, temperature, current, voltage, and wheel bearing temperature, the status of the chassis arm latches, including whether latches are locked safely to the container, and whether an motorized carrier is ready for work or offline for maintenance.

Operating Environment: Typical operating environment information can be: ambient temperature, wind speed, and humidity by tower zone, tower seismic movement activity, fire alarms, total system electrical current and electrical current by zone, total system total system electrical voltage and voltage by zone, electrical system changes caused by movement of motorized carriers, position and of each rail switch and next planned change for rail switch position, temperature of rail switch motor, position of rail switch lock, and status of each rail switch (namely, offline or ready to operate).

Container Information: Typical container disposition information can be: container identification number, container location, time stamp of container lift or lower to rail, container destination, declared and detected weight of container, existence of improper load balance, weight or hazardous condition warning, container size, container laden status, container content classification, whether a container requires customs clearing, whether a container requires refrigeration, the identity of the party currently responsible for the container, and the identity of the next party in the chain of responsibility for the container.

A Control System can respond to three types of input: Spatial Sensors, Operator Commands and Lift & Lower Criteria.

Spatial Sensors: motorized carriers can be equipped with sensors that will provide information for the control system, which can issue commands as the motorized carrier approaches a stopped motorized carrier; as a faster loaded motorized carrier approaches a moving motorized carrier; as a loaded motorized carrier enters a station zone; as a loaded motorized carrier exits a station zone; as a loaded motorized carrier enters a track turn zone; and as each container presents its unique identifier to a tower or station scanner, that current container location can be written to the container movement time-stamp database and made immediately available to the API.

Operator Commands: The control system can issue commands to the motorized carriers, changing their disposition in the following ways:

Destination change prior to lift, including recalculating and communicating planned switch routing for that container.

Destination change post lifting, including checking whether or not the motorized carrier is already past new destination station and if so, rerouting the motorized carrier around the circuit, and if not, responding with immediate route modification.

Uploading a port operator's containers-to-move sequence list and calculating routes for each container based on next available motorized carrier at each container's lifting station.

Moving empty motorized carriers from drop stations to lift stations to facilitate system load balancing and shorten lift wait times.

Begin system-wide movement after a duration of system-wide stop, including initiating staggered motorized carrier starts at current startup speed interval to limit cumulative electric demand from individual motor startups.

Change a loaded motorized carrier's progress from active movement to passive holding, which will reroute the motorized carrier via switching instructions to the holding track, and place the motorized carrier status alerts onto operator's must-resolve console.

Request to pull motorized carrier to the maintenance shed, which will change the motorized carrier's status to offline as soon as it is next empty and route it around the circuit to the maintenance shed track.

Lift & Lower Criteria: the control system can process information about the status of containers and motorized carrier's during the lifting and lowering process in the following ways:

Receive the system's stored individual container size data, once the motorized carrier reaches the lift zone; this information will be reported to the lift operator's control panel and require visual confirmation before attempting pickup.

Initiate lifting of container, but only upon reading all four latch signals as positively locked and safe.

Measure container weight, and compare to container's stored weight data; if within appropriate margin of reported weight, proceed with lift; if within reasonable margin of reported weight, proceed with lift and send warning alarm to System Operator's panel; if heavier beyond the reasonable margin of reported weight, stop lift process and report weight alarm to operator.

Loaded motorized carrier enters a destination lowering zone, proceed to zone only if not preceded by another motorized carrier; when moving into Lowering zone, sensors will detect if there is anything else in the lowering zone aside from the receiving vehicle and if so, the lowering is suspended until the zone is cleared and the Lift Operator has manually re-issued the lowering command.

The system can provide the following operational benefits:

The chassis of the system can employ international (ISO) standard four-corner locking pin mechanisms to securely lift and hold shipping containers during transport and conveyance.

Individual automated container carriers can be programmable, synchronized and individually controlled (sequenced and re-sequenced) for maximum scheduling flexibility and individual container independent movement and tracking.

Integrated lift, set-down, and shuttle equipment can interface with the shipping containers at ship-side gantry cranes, rail heads and truck carrier as well engage and disengage shipping containers from the overhead monorail itself.

The system can have two, three and four parallel monorail tracks, side-by-side, or upper-and-lower, at various points in the system and can convey shipping containers independently in the same and opposite directions at the same time, and with each carrier moving at unique and independent speeds.

Track switches in the system can re-direct containers in two dimensions and can move the carriers with attached containers (or unloaded) to alternative parallel tracks to left, right, top, or bottom adjacent tracks.

The system can convey shipping containers between dockside gantry cranes and one or more container sorting terminals, located at a distance from the dockside terminals.

The system can convey shipping containers over sensitive and protected lands, land already committed to alternative uses, and over water-ways as well.

The system can convey shipping containers while climbing and descending of up various grades. In some embodiments, the grades exceed 12%.

The system can have parallel track bundles serving four functions:
(1) Picking up containers from ships for port evacuation.
(2) Returning containers to a ship.
(3) Delivering a container to an internal port holding or transshipment stack.
(4) Queuing empty or loaded carriers waiting to be directed to next destination.

The system can have an integrated transport system for maintenance and emergency personnel, located above the primary rails, which allows maintenance personnel to access the system while it is operating.

The system can operate in conjunction with, or independently of, existing trans-shipment facilities which continue to utilize and can co-exist with traditional rail or truck (or other wheel-based) transport.

The system can utilize and complement existing transportation corridors, and may not require special or new corridors The system can operate adjacent to, and above, existing as-built conditions and existing land uses (for example, docks, buildings, utilities, highways and railroad lines).

The system can optimize each individual route for container movements between pick-up and delivery points without the constraints required by grade based systems.

The system is capable of placing columns (support towers) at near-shore coastal waters and harbors, allowing new routes of ingress and egress from port locations and can extend independently into ship accessible waters, to load and unload ships.

The system can lift, support, and transport all standard-sized intermodal shipping containers and is adaptable to greater loads if standards change.

The system is capable of reusing, integrating and storing energy generated by renewable energy.

The system is designed to operate autonomously programmed carriers, with limited human oversight, operating at speeds up to 75 kilometers per hour and meet the unload rate(s) (for example, eight containers per minute) required to keep pace with ship-side operations.

The system is able to navigate a wide range topographical and weather conditions. The columns and rails can structurally withstand winds of up to 190 kilometers per hour and operations are not restricted by the typically restrictive weather related limitations, such as cold, snow, rain, heat or fog.

The system is not restricted or limited by nighttime and darkness.

The system can incorporate a unique wheel-surface-to-rail coated wheel system with a variable speed and climb ratios and reduces noise pollution. The system can utilize direct positive mechanical engagement for inclines and declines, via cables/ropes, gears, or chains drives when traversing inclines and declines.

The system can incorporate and utilize real-time command and control systems using radiofrequency, global positioning systems, optical character recognition scans and performance-safety feedback data.

The system can include secure real-time performance reporting and real-time dashboards available on authorized personnel's computers and mobile devices.

The system can reduce diesel and truck emissions.

The system is not harmful to roads, highways, bridges or tunnels.

The system structural backbone can provide a single source infrastructure system for international shipping container transport, as well as the distribution of electrical power and communications (fiber optic and cable), as well as for the generation of regenerative power (kinetic recovery), and solar and wind energy.

The system can provide handling and conveyance of natural gas, liquids (for example, oil, water, sewage, anhydrous ammonia) and slurry suspended materials.

The system can be specifically designed to restrict malicious or mischievous interference, tampering or impeding.

The system can include safety features to protect operators and the public from possible harm regarding moving, falling, stopping, starting, switching, and accumulating conditions, both normal and unexpected.

The system provides overhead, unobstructed and individually controlled and guided transport of multiple sizes of international shipping containers between dockside gantry crane "handoff" locations and (1) designated truck and rail trans-shipment locations, and (2) one or more inland container sorting terminals, and (3) holding stacks at berth-side.

The system enables faster loading and offloading of container ships and quicker "through-port" container movement.

The system provides the above advantages while significantly reducing numbers of handlings per container, by replacing "intra-port" container trans-shipment stacking via truck or straddle carrier (or other wheeled transport) at dockside.

In some embodiments, the system can be designed to, whole or in part, traverse over natural and man-made bodies of water, rivers, lakes, seas and oceans.

While particular elements, embodiments and applications of the invention have been shown and described, it will be understood, that the invention is not limited thereto since modifications can be made by those skilled in the art without departing from the scope of the present disclosure, particularly in light of the foregoing teachings.

What is claimed is:

1. An overhead transport and route management system comprising:
   (a) a suspended railway extending in the longitudinal direction comprising:
      (i) at least one track switch configured to communicate directly with a first motorized carrier to selectively direct said first motorized carrier to different portions of said suspended railway;
   (b) said first motorized carrier configured to travel along said suspended railway, said first motorized carrier comprising:
      (i) at least one spatial sensor for providing information regarding location and movement of said first motorized carrier to a remote control system; and
      (ii) an on-board control system configured to control acceleration and deceleration of said first motorized carrier and communicate spatial information detected by said at least one spatial sensor to said remote control system;
   (c) a second motorized carrier configured to travel along said suspended railway carrying a second container; and
   (d) said remote control system configured to synchronize operation of said first motorized carrier and said second motorized carrier.

2. The overhead transport and route management system of claim 1, wherein said suspended railway comprises a single elevated rail.

3. The overhead transport and route management system of claim 1, wherein said suspended railway is multi-tiered and multi-tracked.

4. The overhead transport and route management system of claim 1, wherein said first motorized carrier further comprises:
   (iii) a bumper and deflection system configured to prevent said first container from contacting said second container.

5. The overhead transport and route management system of claim 1, wherein said at least one track switch communicates wirelessly with said remote control system.

6. The overhead transport and route management system of claim 1, wherein said electric motor comprises an internal braking mechanism capable of providing regenerative power.

7. The overhead transport and route management system of claim 1, wherein said remote control system is configured to adjust the maximum speed of said first motorized carrier.

8. The overhead transport and route management system of claim 1, wherein said remote control system is configured to adjust the minimal allowable distance between said first motorized carrier and said second motorized carrier.

9. The overhead transport and route management system of claim 1, wherein said remote control system is configured to monitor conditions of said first container.

10. The overhead transport and route management system of claim 9, wherein said remote control system is configured to adjust the maximum speed of said first motorized carrier based on said conditions of said first container.

11. The overhead transport and route management system of claim 9, wherein said remote control system is configured to adjust the minimum allowable distance between said first motorized carrier and said second motorized carrier based on said conditions of said first container.

12. The overhead transport and route management system of claim 9, wherein said conditions of said first container are used to prioritize transport and delivery of said first container over said second container.

* * * * *